Patented June 20, 1944

2,352,037

UNITED STATES PATENT OFFICE 2,352,037

MANUFACTURE OF RENNET

Basil Duperier Thornley and Stanley Hilton, Wilmslow, England, assignors to Benger's Limited, Holmes Chapel, Cheshire, England No Drawing. Application March 26, 1941, Serial No. 385,306. In Great Britain March 28, 1940

16 Claims. (Cl. 195—63)

This invention relates to improvements in the manufacture of rennet for use in coagulating milk and particularly to improvements in solid rennet preparations in the form of powder or tablets.

According to our invention a moist preparation of rennet or containing rennet, such as for instance is produced by salting out an extract of the enzyme, is mixed with a suitable efflorescent salt which probably acts as a water exchanger whereby water is passed into the atmosphere by hydration followed by de-hydration of the salt used. In this way a dry product adapted for tablet making is obtained.

An efflorescent salt can be considered suitable if it will not appreciably impair the activity of the rennet under the conditions of use and providing of course it has no poisonous or other properties which would render the preparation unfit for use in connection with foodstuffs. It must also be efflorescent under conditions of temperature, pressure and humidity which will not damage the rennet. Accordingly vacuum drying with or without a desiccating agent or drying by application of warmth may be used on a mixture according to the invention. It is to be observed in connection with this criterion of suitability that almost any salt forming definite hydrates can be made to effloresce if the pressure is reduced to a sufficiently low level and the temperature raised sufficiently high, that is, when the vapor pressure of the surrounding atmosphere is reduced sufficiently below that of the particular hydrate. However, only salts, otherwise suitable, forming hydrates with a relatively high vapor pressure can be considered as practically useful water exchangers for the purpose of the invention even when assisted by vacuum and warmth.

Two or more suitable efflorescent salts may be used together providing they do not react together undesirably.

The efflorescent salt need not necessarily be used in anhydrous condition or lower state of hydration although this is generally preferable since drying is then quicker.

Our investigations indicate that sodium sulphate is the most satisfactory drying agent to mix according to the present invention with the moist rennet preparation and we prefer to use this salt in its anhydrous state.

Dipotassium hydrogen phosphate may be added as well as the sodium sulphate to improve the drying effect still further and such addition may be made either before or after the admixture of the moist preparation with the sodium sulphate. However in intimate admixture the resulting dry preparations, when treated with water, are liable to show local alkalinity in the neighborhood of the phosphate particles with the danger of subsequent damage to the rennet on this account. When dipotassium hydrogen phosphate is used to give optimum drying, therefore, the dried rennet powder should be dissolved before use in a slightly acid or neutral buffer solution or added direct to the milk since this itself has sufficient buffering properties to prevent shift of pH. The optimum increase in drying effect appears to be obtained when the dipotassium phosphate is added in sufficient quantity to adjust the pH to about 7.0.

Another salt which can be used according to the invention is magnesium sulphate. The exsiccated form of this salt, $MgSO_4 2H_2O$ takes up the water from a moist rennet preparation to form the hydrate $MgSO_4 7H_2O$. As magnesium sulphate is not very efflorescent at room temperature and normal humidity, the assistance of vacuum or a temperature of about 38° C. in conjunction therewith is required to complete the drying but sufficient drying for powdering and tablet making takes place without these aids.

It is also possible to use disodium hydrogen phosphate as a drying agent for a sufficiently acid wet preparation. The essential degree of acidity of the wet preparation must be sufficient to permit enough of this salt to be added to bring about drying without raising the pH of the mixture sufficiently above 7.0 to damage the rennet. Disodium hydrogen phosphate when fully hydrated contains 12 molecules of water of crystallization and is efflorescent at room temperatures.

When sodium sulphate is used as drying agent according to the invention the pH of the preparation may be adjusted to about 7.0 either before or after drying, that is before or after the addition of the efflorescent salt, in order to improve its solubility. We prefer to use dipotassium or disodium hydrogen phosphate for the purpose of neutralizing an acid preparation but only in the case already described when dipotassium hydrogen phosphate is used in conjunction with sodium sulphate have we been able to observe any improvement in the drying effect due to such addition of alkali. The precautions already indicated to avoid the development of local alkalinity when dipotassium hydrogen phosphate and sodium sulphate are used together and the dry preparation containing them is subsequently moistened should also be adopted whenever alkali is added to improve the solubility of a preparation dried by means of sodium sulphate, the danger being greater when alkalis other than dipotassium or disodium hydrogen phosphate are employed. For a similar reason such alkalis are preferably not added until the preparation has been dried since local alkalinity is liable to destroy part of the rennet whilst still moist during the mixing process. The use of alkali or alkali salt in conjunction with magnesium sulphate serves no useful purpose since insoluble residues are produced when the dry preparation is dissolved for use.

The present invention, which relates solely to the drying of worked up rennet preparations or fractions, is to be distinguished from the process set forth in British Patent Specification No. 188,660, which is concerned with the special problem of producing a dry powder from pancreas glands, either fresh or salted, by grinding up the actual glands with a mixture containing anhydrous sodium sulfate, anhydrous magnesium sulphate or anhydrous sodium phosphate together with other essential salts to produce almost immediate drying of the glandular material.

The following experimental data serves to illustrate practical details of the invention by way of example:

In these experiments moist precipitated rennet, obtained from the acid precipitation process according to our co-pending application for Letters Patent numbered 342,686, was used as the moist rennet preparation to be dried.

*Example 1—Use of anhydrous sodium sulphate*

50 grams of the wet preparation were mixed with 50 grams of anhydrous sodium sulphate. The pH of the mixture was 3.6. The sodium sulphate slowly hydrated during twelve hours at room temperature forming a hard dry mass containing characteristic crystals of $$Na_2SO_4 \cdot 10H_2O$$

After drying efflorescence gradually took place. This was facilitated by crushing the hard cake. 92 grams of the dry solid, before complete efflorescence had taken place, was obtained containing the whole of the original rennet activity.

*Example 2—Use of anhydrous sodium sulphate in conjunction with dipotassium hydrogen phosphate*

39 grams of the wet preparation were mixed with 39 grams of anhydrous sodium sulphate. 19 grams of dipotassium hydrogen phosphate were mixed into the mass, the resulting pH of which was 7.2. The temperature of the mixture increased by about 5° C. and drying commenced immediately. After 45 minutes the mass was dry and contained partly effloresced crystals of sodium sulphate. Efflorescence was complete in a few hours at room temperature. 80 grams of dry powder containing the whole of the original rennet activity were obtained.

*Example 3—Use of fully-hydrated sodium sulphate*

20 grams of the wet preparation were mixed with 20 grams of fully-hydrated sodium sulphate ($Na_2SO_4 \cdot 10H_2O$). The pH of the mixture was 3.6. The mixture dried in two days at room temperature. 18.5 grams of the resulting dry solid were obtained containing the whole of the original rennet activity.

*Example 4—Use of fully-hydrated sodium sulphate in conjunction with dipotassium hydrogen phosphate*

50 grams of the wet preparation were mixed with 50 grams of fully-hydrated sodium sulphate ($Na_2SO_4 \cdot 10H_2O$). 19 grams of dipotassium hydrogen sulphate were mixed with the mass, the resulting pH of which was 7.2. This mixture would have taken several days to dry without the aid of vacuum. The mixture was therefore placed over calcium chloride at room temperature in a vacuum desiccator. After 48 hours, 65 grams of dry product containing the whole of the original rennet activity were obtained.

*Example 5—Use of exsiccated magnesium sulphate*

20 grams of the wet preparation were mixed with 20 grams of exsiccated magnesium sulphate ($MgSO_4 \cdot 2H_2O$). The pH of the mixture was 3.4. The mixture dried sufficiently in twelve hours at room temperature: 31.0 grams of dry solid were obtained containing the whole of the original rennet activity.

*Example 6—Use of fully hydrated magnesium sulphate*

50 grams of the wet precipitate were mixed with 50 grams of fully hydrated magnesium sulphate ($MgSO_4 \cdot 7H_2O$). The pH of the mixture was 3.2. Drying was accelerated by vacuum at room temperature over calcium chloride. The mixture took from 4 to 5 days to dry. 65 grams of dry solid were obtained containing the whole of the original rennet activity.

In the foregoing examples a mixture is considered to be dry when it can readily be ground to a fine powder. This can be readily made into tablets.

Throughout this specification the measurement of the pH of the various mixtures was carried out on saturated solutions thereof.

We claim:

1. The process of drying moist rennin-containing material derived from rennets, and having a pH below about 3.6, which comprises, mixing with said material a salt capable of hydration, selected from the group consisting of anhydrous sodium sulphate and exsiccated magnesium sulphate, and permitting transpiration into the vapor state of water present in the mixture until the residue thereof reaches a predetermined degree of dryness.

2. The process defined in claim 1 wherein the salt is added in a quantity approximately equal to the weight of the material to be dried.

3. The process of drying moist rennin-containing material derived from rennets, and having a pH below about 3.6, which comprises, mixing with said material a monohydrogen phosphate of an alkali metal in amount sufficient to increase the pH of the mixture, but insufficient to raise the pH substantially above 7.0, and sodium sulphate, and permitting transpiration into the vapor state of water present in the mixture until the residue thereof reaches a predetermined degree of dryness.

4. The process defined in claim 1 wherein the transpiration of water is effected in a vacuum.

5. The process defined in claim 1 wherein the transpiration of water is accelerated by applying heat to raise the mixture to a temperature not in excess of about 38° C.

6. The process defined in claim 1 wherein the transpiration of water is effected in a vacuum and at an elevated temperature not exceeding about 38° C.

7. The process of drying moist rennin-containing material derived from rennets, said material having an initial pH below about 3.6, which comprises, mixing with said material a salt capable of efflorescence, selected from the group consisting of sodium sulphate and magnesium sulphate, and permitting transpiration into the vapor state of water present in the mixture until the residue thereof reaches a predetermined degree of dryness.

8. The process as defined in claim 7 wherein the salt is added in a quantity approximately equal to the weight of the material to be dried.

9. The process defined in claim 7 wherein the transpiration of water is effected in a vacuum.

10. The process defined in claim 7 wherein the transpiration of water is accelerated by applying heat to raise the mixture to a temperature not in excess of about 38° C.

11. The process defined in claim 7 wherein the transpiration of water is effected in a vacuum and at an elevated temperature not exceeding about 38° C.

12. A milk coagulant in the form of a powder, comprising rennin-containing material derived from rennets, said material having an initial pH below about 3.6, in admixture with sodium sulphate and a monohydrogen phosphate of an alkali metal, said sodium sulphate and said phosphate forming together a major fraction of said powder, and said phosphate being present in said powder in quantity sufficient to raise the pH of said rennin-containing material, but insufficient to raise said pH substantially above 7.0.

13. A milk coagulant in the form of a powder comprising rennin-containing material derived from rennets, said material having an initial pH below about 3.6, in admixture with saline material capable of efflorescence, and selected from the group consisting of sodium sulphate and magnesium sulphate, said saline material forming a major fraction of said powder.

14. The process of drying moist rennin-containing material derived from rennets, said material having an initial pH below about 3.6, which comprises, mixing with said material a monohydrogen phosphate of an alkali metal in amount sufficient to increase the pH of the mixture, but insufficient to raise the pH substantially above 7.0, and anhydrous sodium sulphate, and permitting transpiration into the vapor state of water present in the mixture until the residue thereof reaches a predetermined degree of dryness.

15. A milk coagulant in the form of a powder, comprising rennin-containing material derived from rennets, said material having an initial pH below about 3.6, in admixture with anhydrous sodium sulphate and a monohydrogen phosphate of an alkali metal, said anhydrous sodium sulphate and said phosphate forming together a major fraction of said powder, and said phosphate being present in said powder in quantity sufficient to raise the pH of said rennin-containing material, but insufficient to raise said pH substantially above 7.0.

16. A milk coagulant in the form of a powder, comprising rennin-containing material derived from rennets, said material having an initial pH below about 3.6, in admixture with saline material capable of hydration, said saline material being selected from the group consisting of anhydrous sodium sulphate and exsiccated magnesium sulphate, and forming a major fraction of said powder.

BASIL DUPERIER THORNLEY,
STANLEY HILTON.

---

CERTIFICATE OF CORRECTION.

Patent No. 2,352,037.  June 20, 1944.

BASIL DUPERIER THORNLEY, ET AL.

It is hereby certified that error appears in the printed specification of the above numbered patent requiring correction as follows: Page 2, first column, line 31, before the word "was" insert --now Patent No. 2,337,947 issued December 28, 1943--; and that the said Letters Patent should be read with this correction therein that the same may conform to the record of the case in the Patent Office.

Signed and sealed this 5th day of September, A. D. 1944.

Leslie Frazer (Seal)  Acting Commissioner of Patents.

CERTIFICATE OF CORRECTION.

Patent No. 2,352,037. June 20, 1944.

BASIL DUPERIER THORNLEY, ET AL.

It is hereby certified that error appears in the printed specification of the above numbered patent requiring correction as follows: Page 2, first column, line 31, before the word "was" insert --now Patent No. 2,337,947 issued December 28, 1943--; and that the said Letters Patent should be read with this correction therein that the same may conform to the record of the case in the Patent Office.

Signed and sealed this 5th day of September, A. D. 1944.

Leslie Frazer (Seal) Acting Commissioner of Patents.